(12) United States Patent
Prins

(10) Patent No.: US 8,281,526 B2
(45) Date of Patent: Oct. 9, 2012

(54) STAIRWAY TREAD AND RISER ASSEMBLY

(75) Inventor: Michael Henry Prins, Hudsonville, MI (US)

(73) Assignee: MPI Concepts, Inc., Hudsonville, MI (US)

( * ) Notice: Subject to any disclaimer, the term of this patent is extended or adjusted under 35 U.S.C. 154(b) by 7 days.

(21) Appl. No.: 12/773,418

(22) Filed: May 4, 2010

(65) Prior Publication Data

US 2011/0271612 A1    Nov. 10, 2011

(51) Int. Cl.
*E04F 11/00* (2006.01)
*E04F 19/10* (2006.01)

(52) U.S. Cl. ............................................ 52/188; 52/191

(58) Field of Classification Search .................... 52/191, 52/182, 98, 100, 188, 712; 403/205, 220; 411/461–468

See application file for complete search history.

(56) References Cited

U.S. PATENT DOCUMENTS

| 4,866,894 A | * | 9/1989 | Brown | 52/182 |
| 5,410,854 A | * | 5/1995 | Kimmell et al. | 52/712 |
| 6,299,378 B1 | * | 10/2001 | Griffith | 403/293 |

* cited by examiner

*Primary Examiner* — Brian Glessner
*Assistant Examiner* — Paola Agudelo
(74) *Attorney, Agent, or Firm* — Warner Norcross & Judd LLP

(57) ABSTRACT

A stairway assembly includes a tread and riser panel attached together by a uniquely designed gusset to form a tread and riser assembly that can be integrally installed on the stringers. In one embodiment, a first portion of the gusset includes a first attachment structure connected to the lower surface of the tread, and a second portion of the gusset has a second attachment structure connected to the lower surface of the riser. The first portion of the gusset extends at an angle from the second portion, with the side edge of the riser overlapping and facing the upper surface of the tread, and said tread side edge faces said gusset. The gusset may include an elongated slot that forms a line of weakening in the gusset. The gusset may be bent about the line of weakening to move the tread and riser into the final position in which the tread is perpendicular to the riser.

16 Claims, 4 Drawing Sheets

US 8,281,526 B2

STAIRWAY TREAD AND RISER ASSEMBLY

BACKGROUND OF THE INVENTION

The present invention relates to stairways, and more particularly to an assembly for constructing a tread and riser for a stairway.

Conventional stairways, especially in residential construction, typically include three wooden stringers with portions notched out to define the rise and run of each step. Two of the stringers are spaced apart at the sides of the stairway, and the third stringer is positioned in between the outer stringers to provide support for the stairway. Individual tread panels are nailed to the stringers on the horizontal portions of each notch, and individual riser panels are nailed to the stringers at the vertical portions of each notch.

The tedious nature of notching out three stringers, in addition to the necessity of having to attach each individual tread and each individual riser to the stringers, makes the installation of stairways a time consuming process. Mistakes commonly occur when notching out the stringers, which adds additional time, and cost, to the process. As a result, stairway manufacturers, contractors and do-it-yourself installers are continually searching for a simple, efficient and accurate way to construct stairways.

SUMMARY OF THE INVENTION

The present invention provides a stairway assembly with a tread and riser panel attached together by a uniquely designed gusset to form a tread and riser assembly that can be integrally installed on the stringers.

In one embodiment, the gusset is connected to the tread panel and the riser panel. A first portion of the gusset includes a first attachment structure connected to the lower surface of the tread, and a second portion of the gusset has a second attachment structure connected to the lower surface of the riser. The first portion of the gusset extends at an angle from the second portion, with the side edge of the riser overlapping and facing the upper surface of the tread, and said tread side edge faces said gusset.

In one embodiment, the gusset includes at least one elongated slot that forms a line of weakening in the gusset. The line of weakening may be positioned between the first attachment structure and the second attachment structure, and the gusset may be bent about the line of weakening. In one embodiment, the side edge of the tread is aligned on the gusset over the line of weakening, and the second attachment structure is spaced from the line of weakening by a distance at least at great as the thickness of the tread. As a result, when the tread is attached to the first attachment structure and the riser is attached to the second attachment structure, the gusset can be bent about the line of weakening to move the tread and riser into the final position in which the tread is perpendicular to the riser. In another embodiment, the first and second attachment structures are nail-like protrusions that extend from the upper surface of the gusset, such that the protrusions can be pressed into the tread and riser to attach the tread and riser to the gusset.

The present invention further provides a method for forming a stairway assembly, including: (1) providing a gusset having an upper surface, a lower surface, a tread attachment structure and a riser attachment structure; (2) providing a tread panel having an upper surface, a lower surface and a side edge; (3) providing a riser panel having an upper surface, a lower surface and a side edge; (4) positioning the tread panel at a predetermined position with respect to the tread attachment structure; (5) positioning a riser panel at a predetermined position with respect to the riser attachment structure; (6) attaching the tread panel to the gusset at the predetermined location with the tread attachment structure; (7) attaching the riser panel to the gusset at the predetermined location with the riser attachment structure; and (8) bending the gusset into a position in which, when the tread panel and the riser panel are attached to the gusset, the side edge of the riser panel overlaps and faces the upper surface of the tread panel, wherein the upper surface of the tread panel is perpendicular to the upper surface of the riser panel. In one embodiment, the tread panel and the riser panel are attached to the gusset with the gusset in a flat position, such that the side edge of the tread panel faces the side edge of the riser panel, and the step of bending the gusset includes bending the gusset from the flat position to an angled position with the tread panel and the riser panel attached to the gusset.

The tread and riser assembly provided by the present invention can simplify stairway installation and save installation time in multiple ways. For example, the attachment of treads and risers to a gusset prior to installation on a stairway—perhaps prior to being shipped to a building site—reduces the time necessary to align and attach each tread and riser to the stringers. In addition, the strength provided by the gusset along the rear surface of each tread and riser assembly can enable builders to form stairway assemblies without the middle stringer. This not only leads to a reduction in installation time, it also leads to a reduction in materials.

These and other objects, advantages, and features of the invention will be readily understood and appreciated by reference to the detailed description of the current embodiment and the drawings.

DETAILED DESCRIPTION OF THE CURRENT EMBODIMENTS

I. Overview

Figure 6:
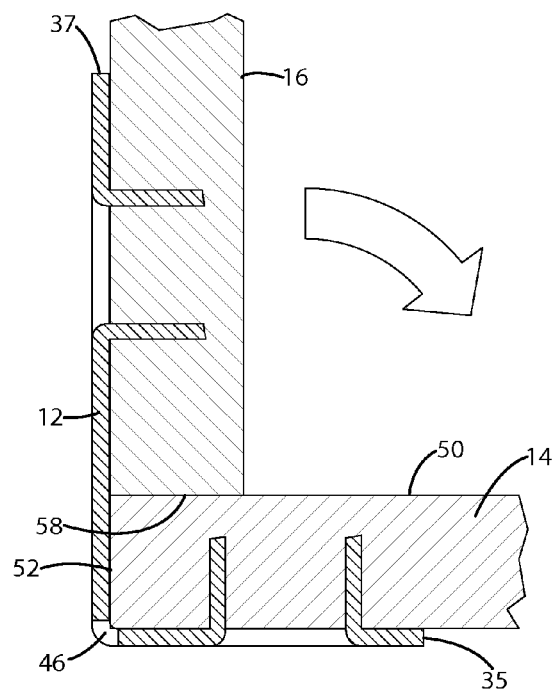
FIG. 6 is a side cross sectional view of the treat and riser assembly in a folded position.
Figure 7:
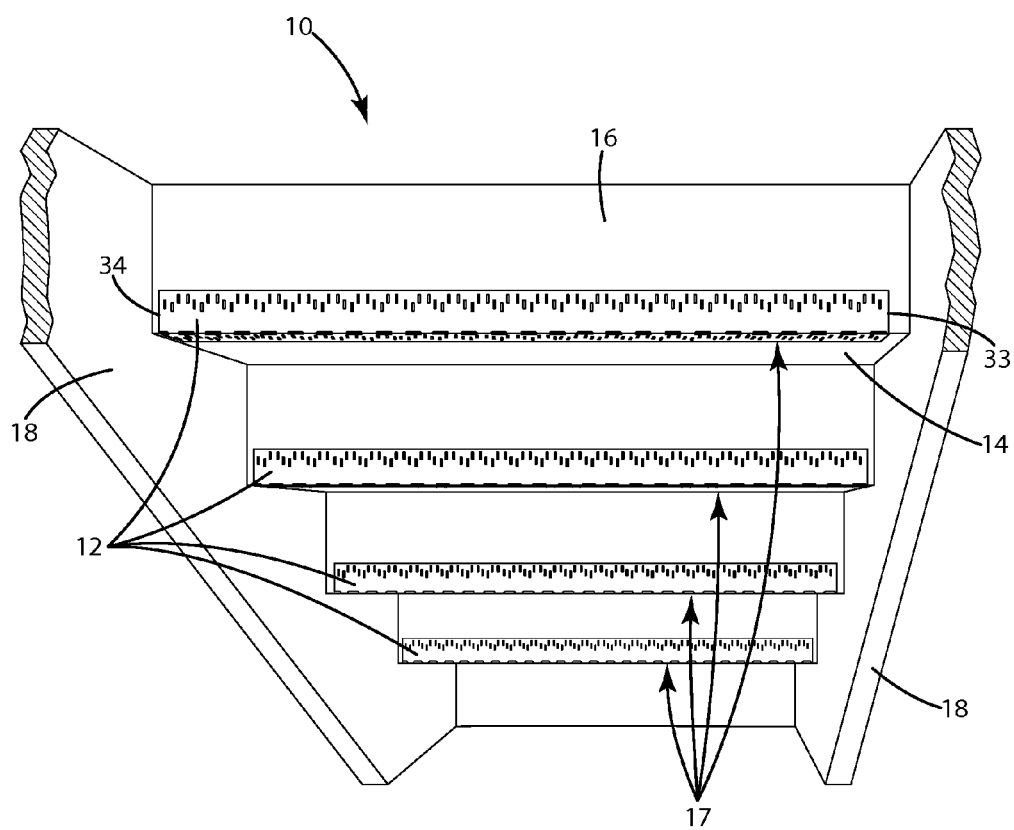
FIG. 7 is a rear perspective view of a stairway assembly according to one embodiment of the present invention.

A stairway system including a tread and riser assembly according to one embodiment of the present invention is shown in FIG. 7 and generally designated 10. In one embodiment, shown in FIGS. 1-7, the stairway system 10 includes a gusset 12 attached between a tread 14 and a riser 16, forming an integrated tread and riser assembly 17. The tread and riser assembly 17 can be attached to one or more stair stringers 18 to form a completed stairway 10. In one embodiment, the gusset 12 is configured to attach to the tread 14 and riser 16 in a manner that enables attachment of a lower surface 22 of the tread 14 and a lower surface 24 of the riser 16 to the gusset 12 with the gusset 12 in a flat position, and further enables bending the gusset 12 to an angled position wherein the tread 14 extends approximately perpendicular to the riser 16.

II. Structure

Figure 1:
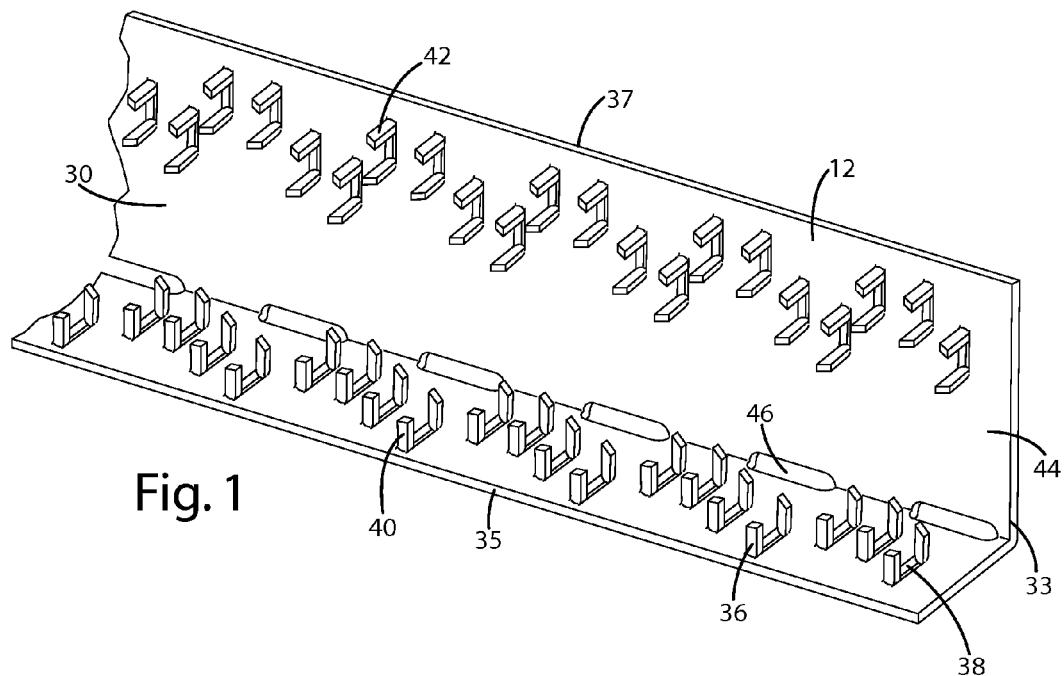
FIG. 1 is a perspective view of a portion of bracket according to one embodiment of the present invention.
Figure 2:
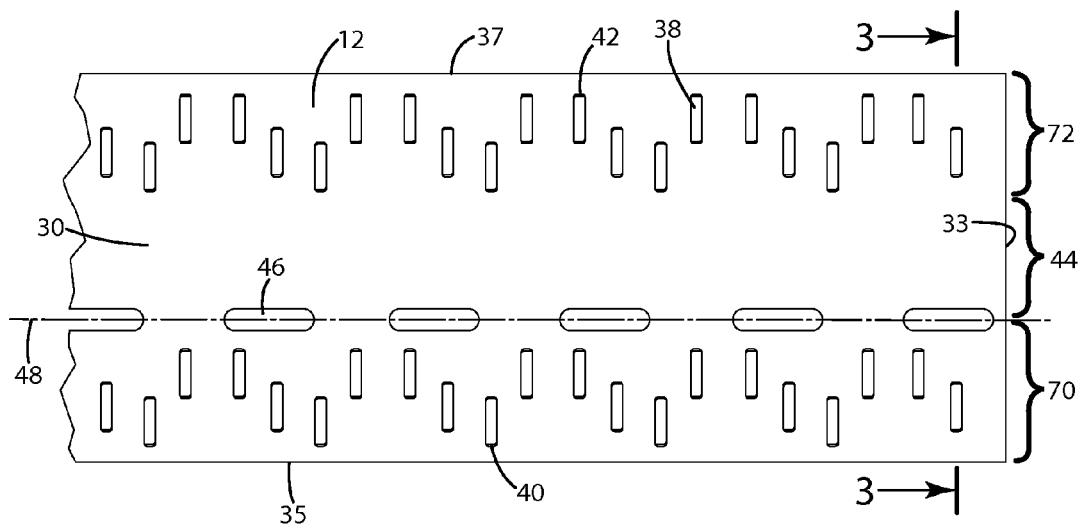
FIG. 2 is a top view thereof.
Figure 3:
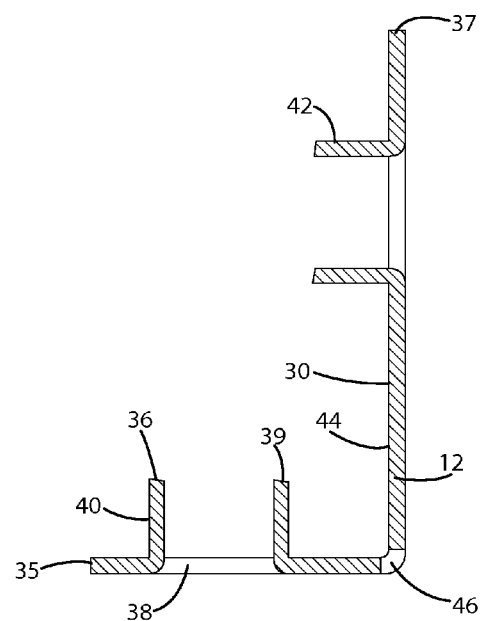
FIG. 3 is a cross sectional view of the bracket along line 3-3 in FIG. 2.

Referring to FIGS. 1-3, in the illustrated embodiment, the gusset 12 is a generally rectangular plate having an upper surface 30, a lower surface 32, a first end 33, a second end 34 opposite the first end 33, a first side edge 35 and a second side edge 37. The longitudinal length of the gusset 12, defined between the first 33 and second 34 ends, may vary, depending on the desired width of the stairway, and the desired length of the gusset 12 with respect to the width of the stairway. In one embodiment, the gusset 12 has a longitudinal length that is substantially the same as the length of the tread 14 in order to provide the most weight bearing support for the tread 14; however, shorter longitudinal lengths may be used. In one embodiment, the longitudinal length of the gusset 12 extends only a portion of the length of the tread 14. In another embodiment, multiple gussets 12 of shortened lengths may be connected to the same gusset 12. The gusset 12 may be formed from a variety of materials, such as steel, aluminum or plastic.

As shown in FIGS. 1 and 3, the gusset 12 may include structure for attaching the gusset 12 to the tread 14 and riser 16. In the illustrated embodiment, a series of nail-like protrusions 36 are formed in the gusset 12 extending from the upper surface 30. As shown, the protrusions 36 are punched from the gusset 12, such that holes 38 are defined between corresponding pairs of protrusions 36. Each protrusion 36 may extend outwardly from the surface 30 to an angled end 39 that enables the protrusion 36 to pierce through the surface of a tread 14 or riser 16. In one embodiment, a first series 40 of protrusions 36 is positioned along the first side edge 35 of the gusset 12 and a second series 42 of protrusions 36 is positioned along the second side edge 37. This leaves a central portion 44 of the gusset 12, between the first series of protrusions 40 and the second set of protrusions 42, with no protrusions. Also in the illustrated embodiment, the gusset 12 includes a series of slots 46 spaced apart along a line 48 extending the longitudinal length of the gusset 12. The slots 46 form a line of weakening along line 48, such that the gusset 12 bends along the line 48. In the illustrated embodiment, the line 48 is positioned near the first series of protrusions 40. Alternate methods of forming a fold line or a weakened region in the central portion 44 of the gusset 12 may otherwise be used.

Figure 4:
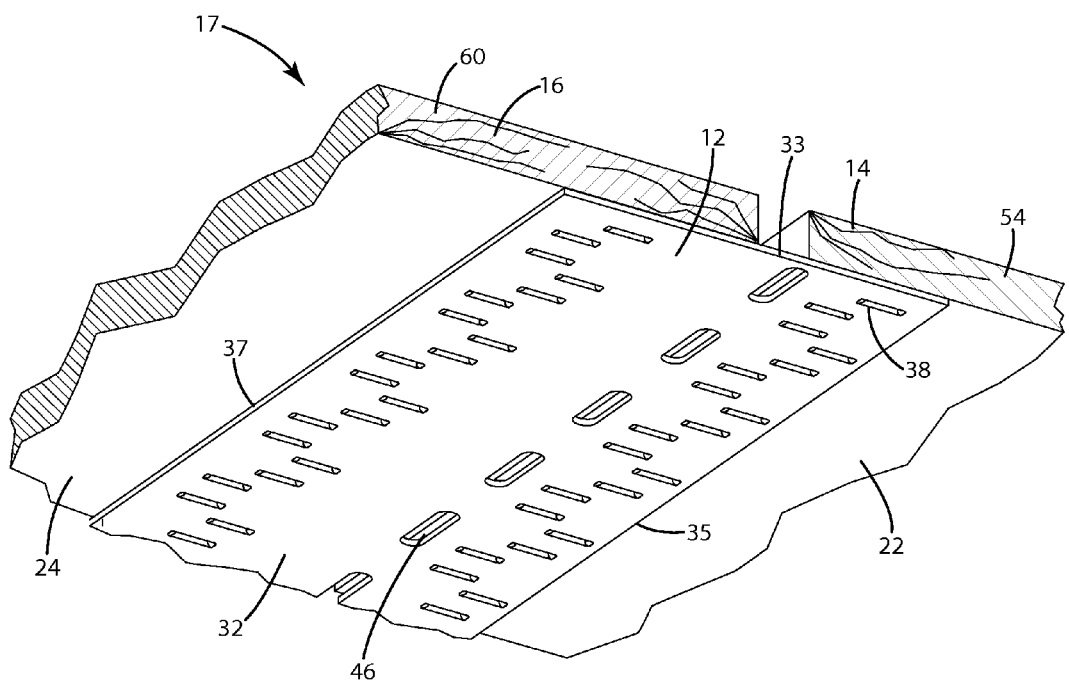
FIG. 4 is a bottom perspective view of a portion of a tread and riser assembly according to one embodiment of the present invention.
Figure 5:
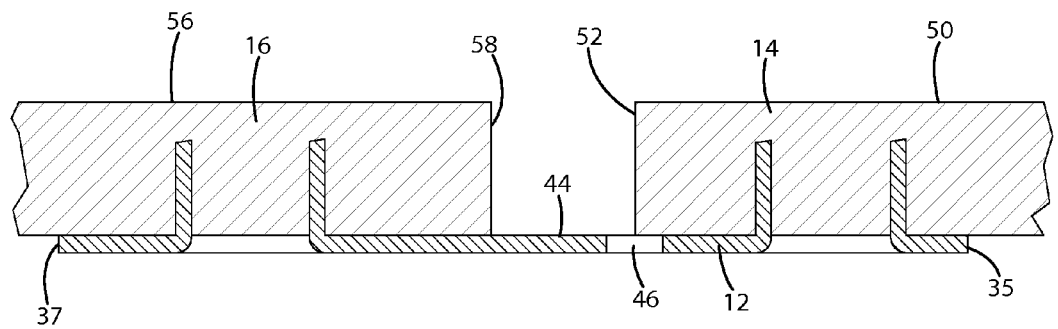
FIG. 5 is a side cross sectional view of the tread and riser assembly according to one embodiment of the present invention.

Referring now to FIGS. 4-6, the tread 14 and riser 16 are generally conventional panels that are formed or cut to a length and width that enable them to span the width of the stairway, and to provide the stairway with the desired rise and run. The tread 14 and riser 16 are typically made from wood; however, alternative materials such as molded plastic, steel or aluminum may also be used. In the illustrated embodiment, the tread 14 includes a lower surface 22, an upper surface 50, a thickness defined between the upper 50 and lower 22 surfaces, a first side edge 52, and a second side edge (not shown) opposite the first side edge 52, a first end 54 and a second end (not shown) opposite the first end 54. Similarly, the riser 16 includes a lower surface 24, an upper surface 56, a first side edge 58, a second side edge (not shown) opposite the first side edge 58, a first end 60 and a second end (not shown) opposite the first end 60. As shown, the lower surface 22 of the tread 14 and the lower surface 24 of the riser 16 are attached to the gusset 12. In the illustrated embodiment, the tread 14 and riser 16 are attached to the gusset 12 by pressing the first series of protrusions 36 into the lower surface 22 of the tread 14 and by pressing the second series 42 of protrusions 36 into the lower surface 24 of the riser 16. More particularly, the tread 14 and riser 16 are attached to the gusset 12 such that the first side edge 52 of the tread 14 is spaced from the first side edge 58 of the riser 16 by a distance approximately equal to, or slightly larger than, the thickness of the tread 14. As a result of this spacing, the tread 14, riser 16 and gusset 12 are capable of being moved to a folded position, shown in FIG. 6, wherein the first side edge 58 of the riser 16 overlaps a portion of the upper surface 50 of the tread 14. The spacing may be such that the first side edge 58 of the riser 16 abuts the upper surface 50 of the tread 14, as shown in FIG. 6, or the spacing may be increased to a distance slightly greater than the thickness of the tread 14 to form a slight gap between the upper surface 50 of the tread 14 and the first side edge 58 of the riser 16. In this embodiment, the distance between the first series 40 of protrusions 36 and the second series 42 of protrusions 36 is at least the same as the thickness of the tread 14.

Referring again to FIG. 6, in the illustrated embodiment, the tread 14 is positioned on the gusset 12 over the first series 40 of protrusions 36, with the first side edge 52 of the tread generally aligned with the fold line 48 formed on the gusset 12, such that the first side edge 52 of the tread 14 abuts or is adjacent to the upper surface 30 of the gusset 12 when the gusset 12 is in the folded position. In one embodiment, the gusset 12 can be generally divided into a first portion 70, which includes the first side edge 35 and the first series 40 of protrusions 36, the central portion 44, and a third portion 72 including the second side edge 37 and the second series 42 of protrusions 36. In the illustrated embodiment, the central portion 44 extends at a generally 90 degree angle from the first portion 60 when the gusset 12 is in the folded position.

As shown in FIG. 7, each tread and riser assembly 17 can be attached to conventional stairway stringers 18, to form a completed stairway 10. In the illustrated embodiment, the tread and riser assemblies 17 are attached between two stringers 18, such that each assembly 17 spans the distance between the stringers 18. Alternatively, additional stringers 18, such as a middle stringer, can be used to provide load bearing support for the stairway, although the added strength provided by the gusset 12 may eliminate the need for additional stringers. In the illustrated embodiment, a portion of the tread 14 and riser 16 extends beyond the ends 33, 34 of the gusset 12 to attach to the stringers 18.

III. Assembly

Assembly of a stairway assembly 10 according to one embodiment of the present invention includes construction of the gusset 12 from one of a variety of materials. In one embodiment, the gusset 12 is formed from sheet steel into a triangular piece having a desired width, thickness and longitudinal length. The longitudinal length may be the predetermined "final" length of the gusset 12, or it may be another length that is intended to be cut to a final size at a later time. In one embodiment, a structure for attaching the gusset 12 to the tread 14 and riser 16 is formed into the gusset 12. For instance, in the illustrated embodiment, protrusions 36 are formed into the gusset 12. Other fastening structure, such as fastener holes, may otherwise be used. The fastening structure may be positioned on the gusset 12 in predetermined locations. As illustrated, the first series 40 of protrusions is formed adjacent to the first side edge 35 and the second series of protrusions 42 is formed adjacent to the second side edge 37, leaving the central portion 44 with no protrusions or other attachment structure. The width of the central portion 44 may be predetermined to be at least greater than the thickness of the tread 14, to enable folding of the gusset 12 to the folded position with the tread 14 and riser 16 attached. A line of weakening 48 may be formed in the gusset 12 at a predetermined location near the first series 40 of protrusions, for example, by forming slots 46 in the gusset 12 along the line 48.

The gusset 12 is attached to the tread 14 and riser 16 using the attachment structure on the gusset 12. In the illustrated embodiment, the tread 14 and riser 16 are positioned on the gusset 12 with the first side edge 52 of the tread 14 generally aligned with the line of weakening 48 and the first side edge 58 of the riser 16 spaced from the first side edge 52 of the tread 14 a distance about the same as the thickness of the tread 14. The tread 14 is pressed onto the first series 40 of protrusions 36 and the riser 16 is pressed onto the second series 42 of protrusions 36 to affix the tread 14 and riser 16 to the gusset 12, thus forming the tread and riser assembly 17.

The tread and riser assembly 17 is bent or folded—either manually or with the assistance of machinery—into the folded position. In the illustrated embodiment, the gusset 12 is folded about the line 48, such that the first portion 60 of the gusset extends at about a 90 degree angle from the central portion 44. In the folded position, the tread 14 and riser 16 are angled at about 90 degrees from each other, with the first side edge 58 of the riser facing the upper surface 50 of the tread 14 and the first side edge 52 of the tread 14 facing the upper surface 30 of the gusset 12. As illustrated, the first side edge 58 of the riser 16 abuts the upper surface 50 of the tread 14; however, in an alternative embodiment the tread 14 and riser 16 are spaced to form a small gap therebetween.

If necessary, the tread 14 and riser 16 may be cut to a desired length in order to match the width of the stairway, for example, by cutting one or both ends of the tread 14 and riser 16. The exposed side edges of the tread 14 and riser 16 may also be cut to provide the tread and riser assembly 17 with the desired rise and run. The tread 14 and riser 16 may be cut before or after the gusset 12 has been bent into the folded position; or before they are attached to the gusset 12. The tread and riser assembly 17 may be attached to the stringers 18 by conventional methods, such as nails or screws, with one tread and riser assembly 17 attached to each stair position on the stringer 18, forming the completed stairway.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property of privilege is claimed are defined as follows:

1. A stairway assembly comprising:
   a tread having a first surface, a second surface, a side edge, and a tread thickness defined between said first tread surface and said second tread surface;
   a riser having a first surface, a second surface and a side edge; and
   a unitary, L-shaped gusset connected to said tread and said riser, said gusset including a first portion having a first attachment structure connected directly to said second tread surface, and a second portion overlying at least a portion of said tread side edge and said second riser surface, said second portion having a second attachment structure connected directly to said second riser surface, said first attachment structure spaced from said second attachment structure by at least the amount of said tread thickness, said first portion extending at an angle from said second portion, wherein said riser side edge faces said first surface of said tread, and said tread side edge faces said gusset, wherein said gusset includes a line of weakening positioned between said first portion and said second portion whereby said gusset is bent about said line of weakening such that said first portion extends at an angle from said second portion.

2. The stairway assembly of claim 1 wherein said gusset is movable about said line of weakening between a flat position in which said tread side edge faces said riser side edge and is spaced from said riser side edge, and an installation position in which said first portion of said gusset extends at an angle from said second portion and said riser side edge faces said first surface of said tread.

3. The stairway assembly of claim 1 wherein said line of weakening includes a series of elongated slots defined in said gusset.

4. The stairway assembly of claim 1 wherein said gusset includes a central portion between said first portion and said second portion, said central portion extending at an angle from said first portion, said central portion facing said side edge of said tread and said second riser surface.

5. The stairway assembly of claim 4 wherein said central portion is not directly attached to said tread and said riser.

6. The stairway assembly of claim 1 wherein said first attachment structure includes a first series of protrusions extending from said gusset into said second tread surface and said second attachment structure includes a second series of protrusions extending from said gusset into said second riser surface.

7. The stairway assembly of claim 6 wherein said first series of protrusions is positioned adjacent to a first side edge of said gusset and said second series of protrusions is positioned adjacent to a second side edge of said gusset.

8. The stairway assembly of claim 7 wherein said first series of protrusions is spaced from said second series of protrusions by a distance at least at great as said thickness of said tread whereby said gusset is not directly attached to said side edge of said tread.

9. A stairway assembly for connecting a tread panel to a riser panel comprising:
   a gusset having an upper surface, a lower surface, a first series of protrusions and a second series of protrusions, said first series of protrusions attached to a lower surface of the tread panel, said second series of protrusions attached to a lower surface of the riser panel, said gusset including at least one elongated slot extending along said gusset between said first series of protrusions and said second series of protrusions, said slot forming a line of weakening on said gusset, wherein said first series of protrusions is spaced from said second series of protrusions by a distance at least as great as a thickness of the tread whereby said gusset is not directly attached to a side edge of the tread, wherein said gusset is bent at said line of weakening, such that a first portion of said assembly, including a first portion of said gusset and the tread panel, extends perpendicular to a second portion of the assembly including a second portion of said gusset and the riser panel, wherein at least one of said first and second portions of said gusset overlies a side edge of the other one of the tread panel and the riser panel.

10. The stairway assembly of claim 9 wherein a side edge of the riser panel overlaps and faces an upper surface of the tread panel.

11. A method for assembling a stairway comprising:
providing a one-piece, unitary gusset having an upper surface, a lower surface, an integral tread attachment structure, an integral riser attachment structure and a line of weakening between the tread attachment structure and the riser attachment structure, the line of weakening enabling bending of the gusset between a flat position and a bent position;
providing a tread panel having an upper surface, a lower surface and a side edge, the tread panel defining a tread thickness between said upper surface and said lower surface;
providing a riser panel having an upper surface, a lower surface and a side edge;
positioning the tread panel at a predetermined position with respect to the tread attachment structure;
positioning a riser panel at a predetermined position with respect to the riser attachment structure and at a predetermined spacing from the tread panel, wherein the predetermined spacing is greater than the tread thickness;
attaching the tread panel to the gusset at the predetermined location with the tread attachment structure by pressing the tread attachment structure into the tread panel with the gusset in the flat position;
attaching the riser panel to the gusset at the predetermined location with the riser attachment structure by pressing the riser attachment structure into the riser panel with the gusset in the flat position;
bending the gusset into the bent position with the tread panel and the riser panel attached to the gusset at the predetermined spacing, into a position in which the side edge of the riser panel overlaps and faces the upper surface of the tread panel and a portion of the gusset between the line of weakening and the riser attachment structure overlies a side edge of the tread panel, wherein the upper surface of the tread panel is perpendicular to the upper surface of the riser panel.

12. The method of claim 11 wherein the distance is approximately the same as the
thickness of the tread panel.

13. The method of claim 12 wherein the gusset includes at least one elongated slot positioned between the first attachment structure and the second attachment structure, the slot forming the line of weakening in the gusset.

14. The method of claim 13 wherein the at least one slot is spaced from the second attachment structure by a distance at least as great as the thickness of the tread panel.

15. The method of claim 14 wherein the first and second attachment structures each include a plurality of protrusions extending from the upper surface of the gusset.

16. The method of claim 15 including attaching the tread panel and the riser panel to a first stringer and a second stringer, wherein the gusset extends substantially entirely between the first stringer and the second stringer.

* * * * *